United States Patent [19]

Farmer

[11] Patent Number: 4,930,537
[45] Date of Patent: Jun. 5, 1990

[54] VEHICLE MULTIPLE-TANK FUEL SYSTEM

[75] Inventor: Daniel J. Farmer, Snohomish, Wash.

[73] Assignee: PACCAR Inc., Bellevue, Wash.

[21] Appl. No.: 360,253

[22] Filed: Jun. 2, 1989

[51] Int. Cl.$^5$ .............................................. F02M 37/00
[52] U.S. Cl. .................................... 137/265; 137/571; 123/514; 280/834
[58] Field of Search ............... 137/571, 572, 265, 266; 280/834; 123/514, 516

[56] References Cited

U.S. PATENT DOCUMENTS

| | | | |
|---|---|---|---|
| 2,599,699 | 6/1952 | Dilworth et al. | 123/514 X |
| 2,745,478 | 9/1950 | Arens et al. | 137/351 |
| 3,101,771 | 8/1963 | McCuen | 137/571 X |
| 3,409,040 | 6/1965 | Weston et al. | 137/572 |
| 3,677,284 | 7/1972 | Mendez | 280/834 X |
| 3,884,255 | 5/1972 | Merkle | 137/265 |
| 3,960,174 | 6/1976 | Latimer et al. | 137/571 X |
| 3,981,321 | 9/1976 | Risse et al. | 137/255 |
| 4,188,969 | 2/1980 | Lotton et al. | 137/265 X |
| 4,288,086 | 9/1981 | Oban et al. | 280/834 |
| 4,312,372 | 1/1982 | Amos et al. | 137/266 |
| 4,471,744 | 9/1984 | Holtz | 123/514 |
| 4,556,077 | 12/1985 | Peyton | 123/514 X |
| 4,664,144 | 5/1987 | Lemmon | 137/571 |
| 4,683,864 | 8/1987 | Bucci | 123/514 X |
| 4,694,870 | 9/1987 | Vize | 137/265 X |

OTHER PUBLICATIONS

Sketch w/FIGS. 4 & 5.
Sketch w/FIGS. 6, 7 & 8.

Primary Examiner—John Rivell
Attorney, Agent, or Firm—Seed and Berry

[57] ABSTRACT

A vehicle fuel utilization system for a truck having multiple tanks, an above-tank crossover line coupling the two tanks, a draw line coupled only to a primary tank, and a return line coupled to the crossover line or to either of the tanks separately.

11 Claims, 1 Drawing Sheet

VEHICLE MULTIPLE-TANK FUEL SYSTEM

BACKGROUND OF THE INVENTION

This invention relates to a vehicle utilization fuel system for use primarily in internal-combustion road vehicles.

Multiple-tank fuel systems heretofore known employ a plurality of tanks, with the fuel from one tank being passed to another tank through crossover lines coupled to the bottom walls of the tanks. These crossover lines are generally the lowest parts of the vehicle, since flow between the tanks depends upon gravitational forces, and are generally more susceptible to accidental breakage due to debris on the highway or other obstructions which may impact against the below-tank crossover line.

Fuel tank utilization systems, such as shown in U.S. Pat. No. 3,981,321, were developed in which an above-tank crossover line was employed. This patented system requires feed lines of about equal length, about equal inner diameters, and about equal fuel flow restrictions, and requires return lines separate from the feed lines, also each having about equal length, about equal inner diameters, and about equal fuel flow restrictions. This system also removes fuel simultaneously from all of the tanks.

Other systems involve expensive mechanical parts, such as selector valves, for selecting the return and draw from the tanks independently. Each time a fitting or valve is added to a fuel tank system, the possibility of creating an air leak increases. An air leak in a vehicle fuel system, particularly a diesel-powered, internal-combustion system, creates considerable difficulty for the operator to seal the air leak and reinitiate suction and flow of fuel to the diesel engine. If the engine on a large truck, such as a tractor-trailer truck, for example, is deprived of fuel while under way, it will stop the engine and damage the fuel pump.

The same stoppage of the engine and damage to the fuel pump can also occur for any of the fuel utilization systems which draw simultaneously from the multiple tanks. By drawing simultaneously from the multiple tanks, air can be drawn when the higher tank is running low in fuel. If one tank is at a lower elevation than the other, the fuel in the higher tank will be depleted prior to the fuel in the lower tank, allowing the draw tube to suck air, thus depriving the engine and pump of fuel. Tractor-trailer trucks, for example, are frequently driven on crowned or cambered roads, or the engines are idling while the truck is resting on a shoulder. In the United States road system, at least, the right-hand tank, if the tanks are transversely spaced on the vehicle, will thus generally be at a lower elevation than the left-hand tank. In foreign countries such as England, where the vehicles are driven on the left side of the road, the left-hand tank will frequently be below the right-hand tank.

Hereinafter, the term "primary tank" will refer to the tank which is on the lower elevation, the right-hand tank in a U.S. road vehicle and the left-hand tank on a vehicle driven in a country where the vehicle operates on the left-hand side of the road. The other tank will be termed a "secondary tank."

SUMMARY OF THE INVENTION

It is an object of this invention to provide a fuel tank utilization system for optimizing the draw and minimizing the risk of insufficient fuel being supplied to the engine. An above-tank crossover line is used with crossover tubes being connected to the line and terminating at their lower ends at the bottoms of the tanks. A separate draw line is coupled to a draw tube in the primary tank. The draw tube in the primary tank terminates at the bottom of the primary tank. By utilizing a separate draw line, the draw tube can be placed in the primary tank, which is the lower tank of two transversely spaced tanks. This will always insure that the tank with the most fuel will be the one being utilized to supply the engine. Thus, even though the secondary tank becomes depleted of fuel, there may still be sufficient fuel left in the primary tank to feed the engine. A fuel gauge will be provided in the primary tank and will be the only fuel gauge necessary. The return line can be connected to the crossover line or direct to either the secondary tank or the primary tank.

Utilizing this type of system provides the minimum number of connections which could be the source of air leaks. Only one fuel gauge is necessary. The return line does not have to be of any particular length or diameter relative to its connection to either or both tanks. Furthermore, both the return line and the draw line can be connected to the vehicle frame adjacent their respective tanks, making the connection to the frame and tanks easier. It is recognized that this system can be used also with a three or four tank arrangement using two or three crossover lines to the secondary tanks with a single draw line to the primary tank.

DETAILED DESCRIPTION OF THE PREFERRED EMBODIMENTS

Figure 1:
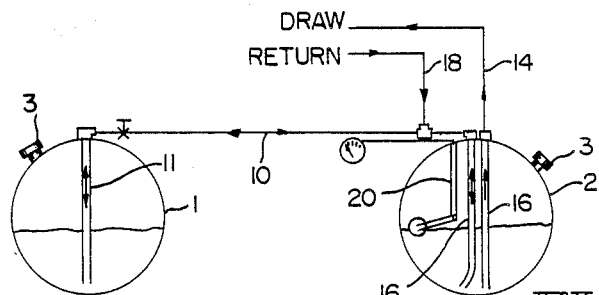
FIG. 1 is a schematic illustration of one embodiment of the invention.

As best shown in the drawings, the vehicle fuel system will include an auxiliary or secondary tank 1 and a primary or main tank 2. These tanks are each provided with a conventional filler cap 3 fitted with a vent to allow the tank to breathe. A crossover tube 11 is connected to the top of the tank and terminates at its lower end at the bottom of the tank. Approximately a 1¼-inch clearance between the bottom of the crossover tube 11 and the bottom of the tank is a suitable clearance. A second crossover tube 12 of similar construction is positioned in the primary tank. A crossover line 10 is coupled to the top ends of the crossover tubes 11 and 12. A return line 18 returns fuel from the diesel engine to the common crossover line 10.

The primary tank is provided with a draw tube 16 having its lower end terminating at the bottom of the primary tank. A draw line 14 is coupled to the top end of the draw tube and connects to the pump for the diesel engine. A conventional float-type fuel gauge unit 20 is provided in the primary tank only. Obviously, a fuel gauge can be positioned in the secondary tank, but is generally unnecessary.

Figure 2:
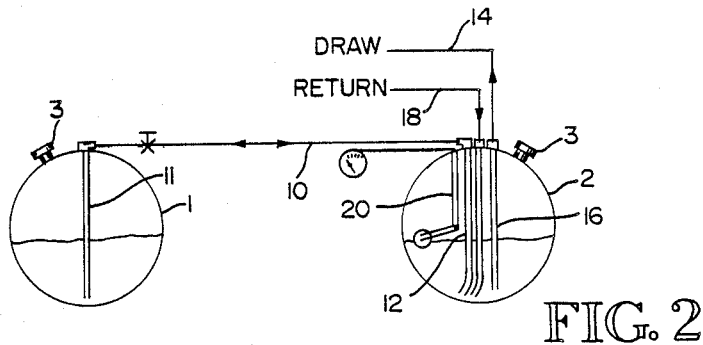
FIG. 2 is a schematic illustration of a second embodiment of the invention.
Figure 3:
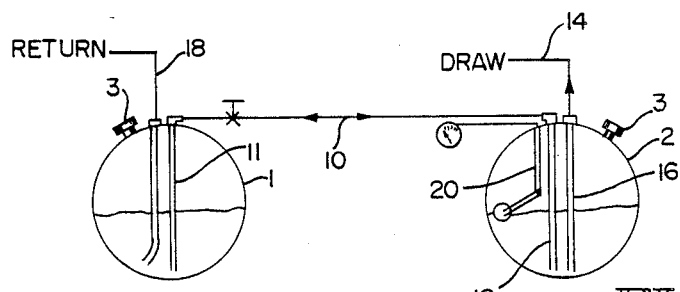
FIG. 3 is a schematic illustration of a third embodiment of the invention.

With this type of system, there is a minimum of connections in the critical draw line between the primary tank and the fuel pump. As is well known to those skilled in the art, and shown for example in the aforementioned Pat. No. 3,981,321 the draw line and the return fuel line of a diesel-powered, internal-combustion engine are connected directly to the combustion chamber injectors, and the opposite end of the return line connects to the fuel tank as shown in the figures. The return line, however, can go either to the crossover line, as shown in FIG. 1, or to the primary tank, as shown in FIG. 2, or only to the secondary tank, as shown in FIG. 3.

The fittings may be of any conventional type which provide a good mechanical connection and a tight seal, or, in the alternative, the pipes may be welded or otherwise joined to upper portions of each tank and extend down into the tanks, as illustrated.

The return lines and draw lines need not be of any critical diameter. The only requirement is that the lines be sufficient to handle the flow of fuel anticipated in the draw system and in the return system. The draw lines and return lines do not have to be located symmetrically or equidistantly between the tanks, but can be located adjacent to one of the tanks for ease of assembly with the vehicle frame.

With this system, the secondary tank can operate at the same level as the primary tank or at a higher level having less fuel in it for a vehicle which is driving on a cambered or crowned road surface or otherwise operated in any instance on an angle. With this system, the fuel is drawn exclusively from one tank, relying on the crossover lines to maintain the levels in the tanks. As is well known to those skilled in the art, the transfer of fuel from one tank to another in the fuel tank systems shown in FIGS. 1-3 necessarily results from different fuel levels in the two tanks. When fuel is drawn from the primary tank 2, the fuel level in the primary tank is lowered below the fuel level of the secondary tank 1, which causes a pressure differential between the crossover line opening in the primary tank and the opening in the secondary tank. Atmospheric pressure forces the fuel in the secondary tank up through crossover tube 11, through the crossover line 10, down crossover tube 11, and into the primary tank until the fuel levels in the two tanks are equalized. This method of transferring liquid is commonly known as siphoning, with the crossover tube being the siphon. That is, the higher level of fuel will automatically force the fuel up out of one tank through the sealed crossover line into the tank whose fuel is at a lower level to maintain the fuel in each tank at the same horizontal plane.

While the preferred embodiments of the invention have been illustrated and described, it should be understood that variations will be apparent to those skilled in the art. Accordingly, the invention is not to be limited to the specific embodiments illustrated in the drawings.

What is claimed:

1. A multiple-tank fuel utilization system for an internal-combustion engine of a road vehicle, comprising:
   spaced-apart primary and secondary fuel tanks;
   a draw tube terminating at a lower end of the primary fuel tank;
   a fuel drawing system for drawing fuel from said primary tank comprising a draw line operatively connected only to the upper end of the draw tube of the primary tank and not operatively connected to the draw tube of the secondary tank and coupled to the engine of the vehicle;
   a fuel transfer system for transferring fuel between said secondary tank and said primary tank comprising crossover tubes in each tank, said crossover tubes each having an upper end and a lower end, a crossover line coupling the upper ends of the crossover tubes and being positioned above the tanks, said crossover line and said crossover tubes providing a continuous passage between said primary and said secondary tank, said passage having two opposite openings, each said opening located below the fuel level of each said tank;
   a vent located above the fuel level of each said tank to allow atmospheric pressure to equalize the fuel levels of each said tank, the fuel being transferred at all times between said secondary tank and said primary tank solely through said crossover line, the fuel transfer system being independent of the fuel drawing system; and
   a return line coupled to at least one of said tanks.

2. The system of claim 1, said return line coupled to said tanks via the crossover line.

3. The system of claim 1, said return line coupled only to said primary tank.

4. The system of claim 1, said return line coupled only to said secondary tank.

5. A vehicle fuel system for an internal-combustion engine of the road vehicle having a plurality of spaced fuel tanks, comprising:
   primary and secondary fuel tanks, each said tank having an air vent;
   means operatively connected between the engine and only to said primary fuel tank for drawing fuel from only said primary tank;
   means positioned above said tanks for transferring fuel between said tanks, said transferring means being independent of said drawing means; and
   means for returning fuel from the engine to at least one of said tanks.

6. The system of claim 5, said means for returning the fuel to at least one of said tanks including a return line coupled to said means for transferring fuel between the tanks.

7. A multiple-tank fuel system for an internal-combustion engine, comprising:
   spaced-apart primary and secondary fuel tanks, each said tank having an air vent for allowing atmospheric pressure to act upon the fuel of each said tank;
   a draw tube terminating at a lower end of the primary fuel tank;
   a draw line being connected only to the upper end of the draw tube and being coupled to the engine of a vehicle;
   crossover tubes in each tank, said crossover tubes each having an upper end and a lower end, a crossover line coupling the upper ends of the crossover tubes and being positioned above the tanks, said crossover line and said crossover tubes providing a continuous passage between said primary and secondary tanks and said passage having two opposite openings, each said opening being located below the fuel level of the respective tank such that when fuel is drawn from said primary tank and the fuel level of the primary tank is lowered, fuel from said secondary tank is transferred to said primary tank by a siphoning force resulting from the fuel level of the secondary tank being higher than the fuel level of the primary tank; and
   a return line coupled to at least one of said tanks.

8. A multiple-tank fuel system for an internal-combustion engine having fuel injectors, comprising:
  spaced-apart primary and secondary fuel tanks, each said tank having an air vent for allowing atmospheric pressure to act upon the fuel of each said tank;
  a draw tube terminating at a lower end of the primary fuel tank;
  a drawn line connected only to the upper end of the draw tube;
  crossover tubes in each tank, said crossover tubes each having an upper end and a lower end, a crossover line coupling the upper ends of the crossover tubes and being positioned above the tanks, the crossover line providing a continuous passage between said primary and secondary tanks and said passage having two opposite openings, each said opening being located below the fuel level of the respective tank so that when fuel is drawn and the fuel level of said primary tank is lowered, fuel from said secondary tank, having a higher level, is transferred to said primary tank; and
  a return line coupled in a continuous flow line directly to the injectors of the engine and to said crossover line, said return line being completely sealed with outside air to prevent air from entering into said return line and crossover line and interrupting the fuel transfer between said primary and said secondary tanks.

9. The method of drawing, returning, and equalizing fuel levels in a multi primary and secondary tank diesel engine system, the tanks each having a level exposed thereabove to atmospheric pressure comprising,
  drawing the fuel to the engine from a primary tank only,
  returning the fuel from the engine to at least one of the tanks,
  transferring the fuel from one tank having a liquid level higher than the liquid level of the other tank, by the higher level of fuel forcing the fuel above levels in the tanks, through a crossover line sealed from air intake into the lower level tank until the liquid levels in each tank are at the same horizontal plane.

10. The method of claim 9, wherein the fuel is returned simultaneously to both tanks.

11. The method of claim 9, wherein the fuel is returned only to one tank.

* * * * *

UNITED STATES PATENT AND TRADEMARK OFFICE
CERTIFICATE OF CORRECTION

PATENT NO. : 4,930,537
DATED : June 5, 1990
INVENTOR(S) : Daniel J. Parker

It is certified that error appears in the above-identified patent and that said Letters Patent is hereby corrected as shown below:

In claim 5, column 4, line 26, please delete "the" and substitute therefor --a--.

In claim 8, column 6, line 1, please delete "with" and substitute therefor --from--.

In claim 9, column 6, line 16, after "fuel above" please insert --both--.

Signed and Sealed this

Third Day of December, 1991

Attest:

HARRY F. MANBECK, JR.

*Attesting Officer*        *Commissioner of Patents and Trademarks*